(12) United States Patent
Leibold et al.

(10) Patent No.: US 9,243,705 B2
(45) Date of Patent: Jan. 26, 2016

(54) GEAR HOUSING

(75) Inventors: Hubert Leibold, Forst (DE); Roland Denefleh, Einhausen (DE); Joachim Sander, Ubstadt-Weiher (DE); Andreas Sigmund, Bruchsal (DE); Martin Gantner, Waghäusel-Kirrlach (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 765 days.

(21) Appl. No.: 13/144,373

(22) PCT Filed: Jan. 12, 2010

(86) PCT No.: PCT/EP2010/000104
§ 371 (c)(1),
(2), (4) Date: Jul. 13, 2011

(87) PCT Pub. No.: WO2010/081671
PCT Pub. Date: Jul. 22, 2010

(65) Prior Publication Data
US 2011/0277589 A1    Nov. 17, 2011

(30) Foreign Application Priority Data

Jan. 13, 2009 (DE) .................. 10 2009 004 779
Dec. 18, 2009 (WO) ............... PCT/EP2009/009135

(51) Int. Cl.
| F16H 57/032 | (2012.01) |
| F16H 57/038 | (2012.01) |
| H02K 5/06 | (2006.01) |

(52) U.S. Cl.
CPC ............ *F16H 57/032* (2013.01); *F16H 57/038* (2013.01); *H02K 5/06* (2013.01); *Y10T 74/2186* (2015.01)

(58) Field of Classification Search
USPC ................................................. 74/606 R, 607
See application file for complete search history.

(56) References Cited

U.S. PATENT DOCUMENTS

| 753,022 | A | * | 2/1904 | White ........................... 475/247 |
| 1,902,934 | A | * | 3/1933 | Acker ......................... 74/606 R |
| 5,301,096 | A | | 4/1994 | Klontz et al. |
| 2001/0009165 | A1 | * | 7/2001 | Notz et al. ..................... 137/884 |
| 2006/0156861 | A1 | | 7/2006 | Yamasaki et al. |
| 2008/0029327 | A1 | * | 2/2008 | Carlson et al. ................ 180/242 |
| 2009/0044649 | A1 | | 2/2009 | Bouche |

FOREIGN PATENT DOCUMENTS

| DE | 201 06 655 | 6/2001 |
| DE | 10 2004 046 232 | 4/2006 |
| DE | 10 2005 031 197 | 1/2007 |
| EP | 0 135 156 | 3/1985 |
| EP | 0 177 001 | 4/1986 |
| WO | WO 2005/095824 | 10/2005 |

OTHER PUBLICATIONS

European Office Action, dated May 21, 2012, issued in corresponding European Patent Application No. 10700944.1.

(Continued)

*Primary Examiner* — Thomas Diaz
(74) *Attorney, Agent, or Firm* — Kenyon & Kenyon LLP

(57) ABSTRACT

A gear housing for a bevel gear having a surface which is made up of sections and attachment faces. The sections are convexly curved along at least one surface curve.

16 Claims, 7 Drawing Sheets

(56) References Cited

OTHER PUBLICATIONS

International Search Report, issued in corresponding International Application No. PCT/EP2010/000104.

Written Opinion, issued in corresponding International Application No. PCT/EP2010/000104.

International Preliminary Report on Patentability, issued in corresponding International Application No. PCT/EP2010/000104.

* cited by examiner

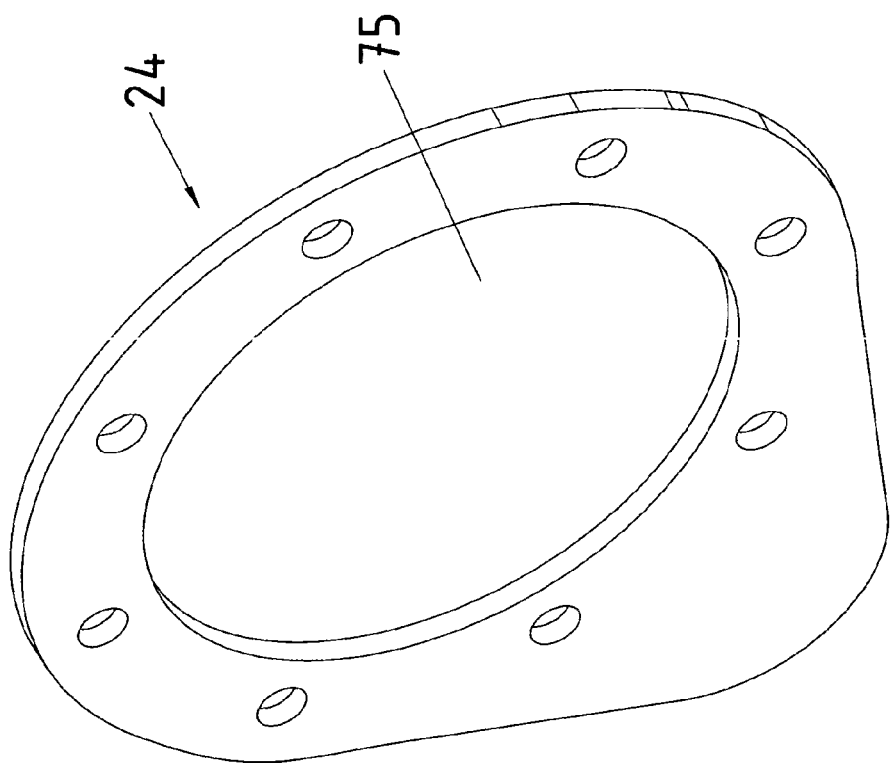

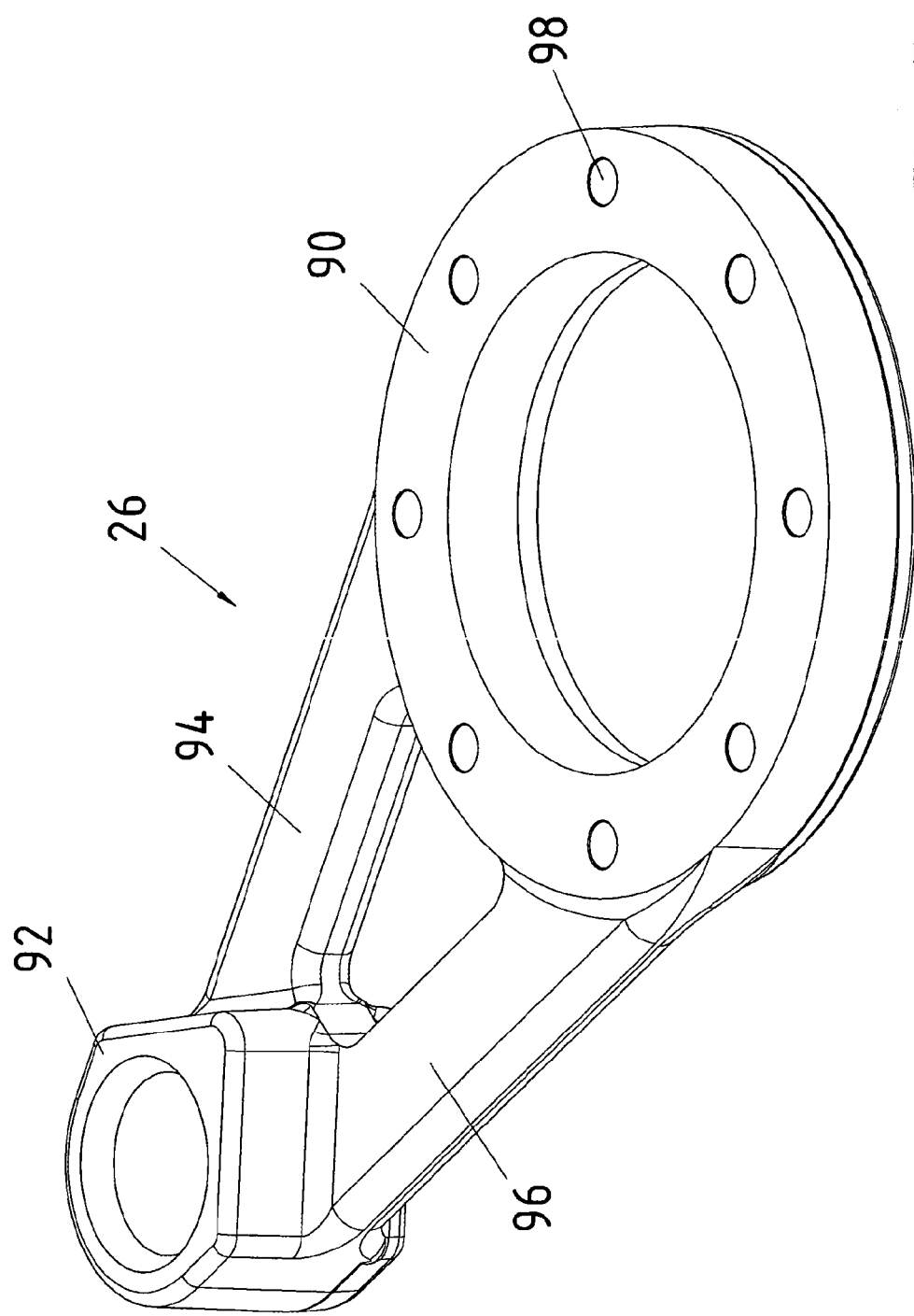

GEAR HOUSING

FIELD OF THE INVENTION

The present invention relates to a gear housing for a bevel gear.

BACKGROUND INFORMATION

German Patent Document No. 201 06 655 U1 describes a clean-room geared motor having a motor section and a gear section which are interconnected and form one unit, the unit having a smooth surface.

SUMMARY

Example embodiments of the present invention provide a gear housing.

Among features of example embodiments of the present invention in the case of the gear housing for a bevel gear are that the gear housing for a bevel gear has a surface which is made up of sections and attachment faces, such that each section borders on at least two attachment faces, and each section is continuously convexly curved along at least one surface curve, the surface curve being the intersection formation of an imaginary normal plane, belonging to one point of the section, with the respective section.

Or, in other words, the gear housing for a bevel gear has a surface which is made up of sections and attachment faces, that is, in particular, has only sections and attachment faces, the sections being convexly curved in at least one direction. The surface curve runs along one direction. The normal plane is perpendicular to a tangent vector of one point on the surface or of the section.

The advantage in this context is that fluids on the surface of the gear housing run off well and contaminants are easily removable without having to provide drain channels.

In example embodiments, the gear housing for a bevel gear has a surface which is made up of sections, planes and attachment faces, such that each section borders on at least two attachment faces or planes, and each section is continuously convexly curved along at least one surface curve, the surface curve being the intersection formation of an imaginary normal plane, belonging to one point of the section, with the respective section, and the planes being disposed in such a way that in the mounting positions provided for the gear housing, each plane forms an angle ($\alpha$) with respect to an imaginary plane (E) whose normal vector is collinear, i.e., parallel to the direction of gravity, the angle being greater than or equal to three degrees.

Or, expressed differently, the gear housing for a bevel gear has a surface which is made up of sections, planes and attachment faces, and when using the gear housing in an installation, the gear housing is mounted in a mounting position, the sections being convexly formed in one direction, and the planes forming an angle with respect to an imaginary plane whose normal vector is collinear with the force of gravity, the angle being greater than or equal to three degrees. The advantage in this context is that in any practical mounting position of the gear housing, fluids on the surface of the gear housing run off well and contaminants are easily removable without having to provide drain channels.

In example embodiments, the sections have a radius of curvature of greater than approximately 3 mm, especially of greater than approximately 6 mm. The advantage in this context is that fluids on the surface of the gear housing run off well and contaminants are easily removable without having to provide drain channels. In addition, these curvatures facilitate removal from a mold when producing the gear housing as a cast part.

In example embodiments, the attachment faces, which preferably have a bore, are perpendicular or parallel to each other, and in the installed state of the gear housing, that is, of a corresponding gear, the attachment faces are covered by corresponding faces of attached devices and/or by a matching cover element. This has the advantage that the gear housing is able to be inserted well into an installation, so that fluids on the surface of the gear housing run off well and contaminants are easily removable without having to provide drain channels.

In example embodiments, a surface of the cover elements facing away from the gear housing is formed in conformance with the sections or the sections and planes. The advantage in this case is that the gear housing has good cleaning properties, and nevertheless, offers the flexibility of a normal gear housing.

In example embodiments, the regions, and therefore the surface, include an intermediate surface which is convexly curved in a first direction and is concavely or convexly curved in a second direction; in particular, the first direction is approximately perpendicular, up to perpendicular with respect to the second direction. This offers the advantage that fluids on the surface of the gear housing run off well, and contaminants are easily removable.

In example embodiments, the gear housing has an output side in which a first and second through-cutout are incorporated, the first and second cutouts forming one common end face, which represents a first attachment face. The advantage in this context is that the common end face is able to be covered well, and at the same time, the second cutout is able to be covered by a cover provided for that purpose, without critical depressions and/or cavities being formed.

In example embodiments, a mounting side of the gear housing has a through-opening with a second attachment face for a cover, whose surface pointing outwardly in the attached state is formed as a gable-roof-type surface having a slope of greater than or equal to three degrees. This offers the advantage that fluids on the surface of the cover, and thus of the gear housing, run off well, and contaminants are easily removable.

In example embodiments, an input side has a third attachment face for flange-mounting a motor, the outer edge of the third attachment face forming a continuous, uninterrupted circle. This offers the advantage that no cavities or depressions are formed between the motor and the gear housing. Thus, a drive unit is obtained which is easy to clean.

In example embodiments, the gear housing is produced from stainless steel, especially from the stainless steel GX5CrNi19-10. The advantage in this context is that the gear housing is easy to clean, and the surface also withstands more aggressive cleaning agents.

In example embodiments, the surface is coated with a non-corrosive and/or anti-adhesive coating, especially a polymer. The advantage in this case is that the gear housing is easy to clean, and the surface also withstands more aggressive cleaning agents.

In example embodiments, the surface has an arithmetical average roughness Ra between approximately 0.8 micrometers and approximately 6.0 micrometers, preferably between approximately 2.5 micrometers and approximately 3.5 micrometers. The advantage here is that contaminants and bacteria have a smaller contact area with the surface of the gear housing, without sinking into depressions on the surface. Thus, a smaller adhesion force results than in the case of a smooth surface, and the gear housing is easier to clean.

In example embodiments, the gear housing has a reinforcement on an inner surface. This has the advantage that the surface of the gear housing has no contours or projections to which contaminants adhere better, or can only be washed away poorly.

Among features of a method for producing a gear housing are that the gear housing is cast from stainless steel, and subsequently, the gear housing is ground and/or electropolished. This is advantageous in that a customary manufacturing process is usable, which is improved with an inventive process step.

LIST OF REFERENCE NUMERALS 10 gear housing
12 first region
13 edge-like region
14 first attachment face
15 first plane
16 second plane
17 cylinder outside surface
18 cylinder outside-surface region
19 intermediate surface
20 cover
24 intermediate plate
26 torque-counteracting support
30 first output side
31 second output side
32 first cutout
33 first bore pattern
34 second cutout
35 third plane
38 supported attachment face
40 mounting side
42 second attachment face
44 gable-roof-type surface
46 assembly opening
50 input side
52 third attachment face
53 second bore pattern
54 outer edge
56 circular opening
60 inner surface
62 elongated thickening
64 annular thickening
70 first through-bore
71 attachment face for venting
72 second through-bore
73 cover bore
74 special attachment face of the cover
76 mounting holes
90 larger, approximately annular element
92 smaller, approximately annular element
94, 96 two legs
98 further bore pattern

BRIEF DESCRIPTION OF THE DRAWINGS

Example embodiments of the present invention are explained in greater detail below with reference to the drawing. The figures show purely schematically:

FIG. 6 is a perspective top view of an intermediate plate for the gear housing shown in FIG. 1.

FIG. 7 is a perspective top view of a torque-counteracting support for the gear housing shown in FIG. 1.

DETAILED DESCRIPTION

Figure 1:
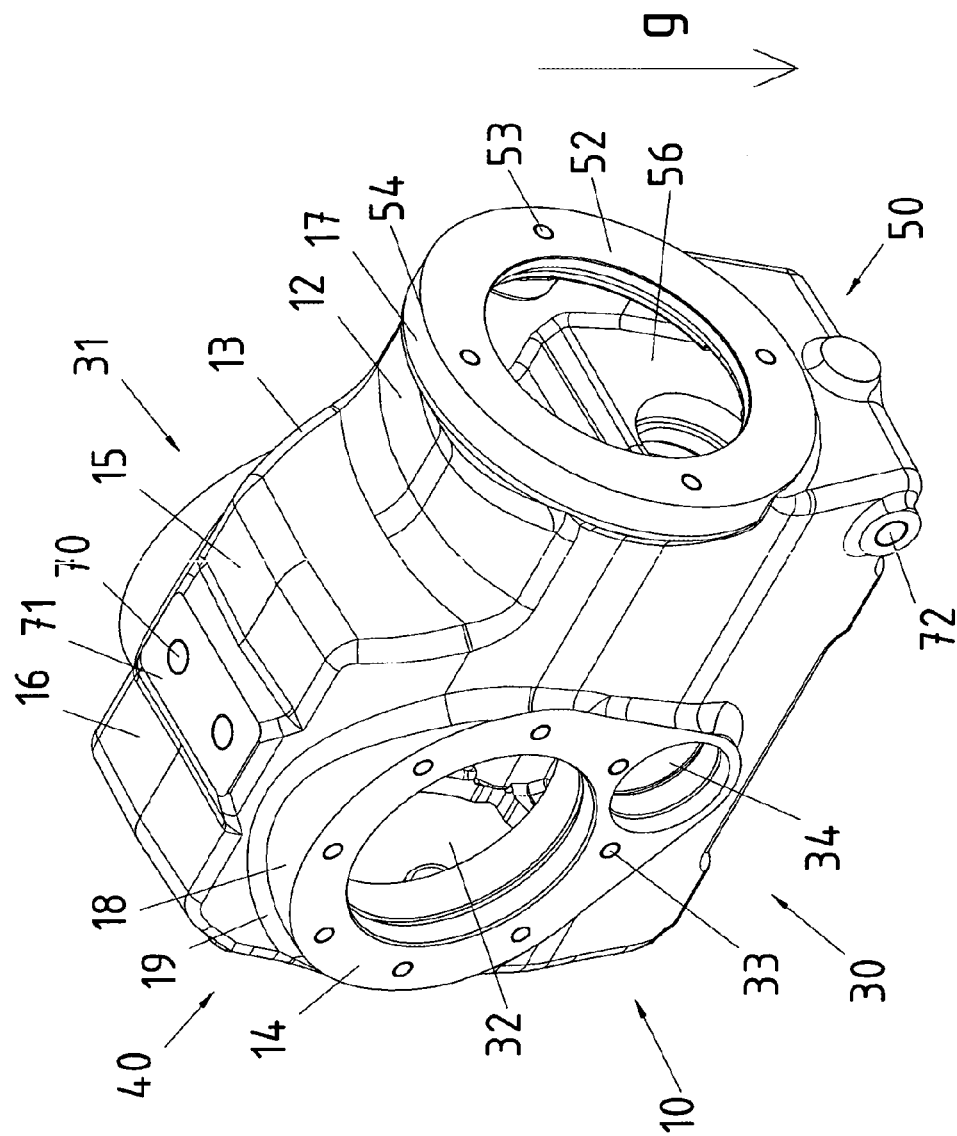
FIG. 1 is a perspective top view of a gear housing according to an example embodiment of the present invention.

FIG. 1 shows a top view of a gear housing 10 according to an example embodiment of the present invention for a bevel gear. A few structural features are predefined for gear housing 10 by the desired functionality of a bevel gear. In particular, gear housing 10 has an input side 50 and an output side. In example embodiments, gear housing 10 has a first output side 30 and a second output side 31 opposite first output side 30. First and second output sides 30, 31 lie in one output plane each, that run parallel to one another and are positioned vertically with respect to an input plane in which input side 50 lies.

Gear housing 10 has a surface which is made up of sections, attachment faces and planes. "Made up of" here means that the surface has only sections, attachment faces and planes. The planes are uncurved, that is, are flat planes within the bounds of accuracy customary for manufacturing as a cast part or with machining techniques. The planes are disposed in such a way that when using gear housing 10 in an installation, for each occurring mounting position of gear housing 10, the planes form an angle $\alpha$ with respect to an imaginary plane E whose normal vector is collinear with the force of gravity g, angle $\alpha$ being greater than or equal to three degrees. Angle $\alpha$ between a second plane 16 and imaginary plane E is drawn in by way of example in FIG. 3.

A first cutout 32 and a second cutout 34 are introduced into first output side 30. First and second cutouts 32, 34 are circular with different diameters. First cutout 32 has a larger diameter and is used for mounting an output shaft. In the case of an output shaft implemented as a solid shaft, the solid shaft protrudes out of first cutout 32. When mounting the finished gear with an output shaft as a hollow shaft, a shaft of a device to be driven is introduced into the hollow shaft, and thus into first cutout 32.

Second cutout 34 is used to mount an intermediate shaft, on which, for example, a crown wheel of a bevel-gear stage is able to be mounted. A first attachment face 14 forms one common end face of first and second cutouts 32, 34.

In the first output side, bores, which produce a first bore pattern 33, are introduced around first cutout 32 in first attachment face 14. For example, this first bore pattern 33 is usable to secure the gear housing in various discrete mounting positions on a device to be driven.

Input side 50 has a circular opening 56 with a third attachment face 52 as end face. Disposed around circular opening 56 in third attachment face 52 are bores, which produce a second bore pattern 53. Second bore pattern 53 is used to attach a motor or a motor adapter to gear housing 10.

To increase the flexibility of the gear housing, the second output side is implemented analogously to the first output side.

The sections are spanned by a first and second direction each. The sections are in each instance convexly curved along at least a first direction, that is, a first surface curve is convexly curved. Advantageously, the sections are also convexly curved along a second direction, that is, a second surface curve is also convex. In certain sections, however, concave curvatures along a first or second direction cannot be avoided.

It is important that in each section, there is always a convexly curved surface curve between two attachment faces. This does not mean that a connecting line between two attachment faces must be convexly curved.

For each point on each section of the surface, a normal plane can be found through the point, which, as intersection formation with the associated section, forms a surface curve which is only convexly curved. "Only convexly curved" is synonymous with "continuously convexly curved." The normal plane intersects the associated section perpendicularly in the point.

Each section borders on at least two attachment faces or planes. This means that the sections in each case border on either at least two attachment faces or two planes, or one attachment face and one plane. However, the sections may also border on a plurality of attachment faces or planes.

Each section is convexly curved along at least one surface curve, the surface curve being the intersection formation of an imaginary normal plane, belonging to one point of the section, with the respective section. The normal plane intersects the surface perpendicularly in the point. The normal plane may be rotated in each section such that its intersection formation with the section of the surface produces a convex surface curve. Thus, a surface curve which is only convexly curved is obtained over the complete section.

The surface of the gear housing may be subdivided into sections, planes and attachment faces in such a way that the conditions described above for the sections, attachment faces and planes are satisfied. This leads to a bulgy appearance of the gear housing, since each section is curved outwardly along at least one direction.

In the exemplary embodiment of a gear housing shown in FIG. 1, the sections are each convexly curved in a first direction. For better identification, the sections are also subdivided into region. A first region 12 is convexly curved in a first direction, and in a second direction perpendicular to the first direction, is flat within the bounds of manufacturing precision. Other regions, such as an edge-like region 13, are convexly formed in their first direction and are likewise convexly formed in their second direction. First region 12, edge-like region 13 as well as cylinder outside surface 17 lie in a section between the third attachment face and first plane 15.

A further region, which is formed as intermediate surface 19 between a cylinder outside-surface region 18 and another region, is convexly curved in a first direction and concavely curved in a second direction, and therefore forms a saddle surface. Intermediate surface 19 runs around first and second cutouts 32, 34. Cylinder outside-surface region 18 and intermediate surface 19 lie in a further section of the surface between first attachment face 14 and the attachment face for venting 71.

Figure 4:
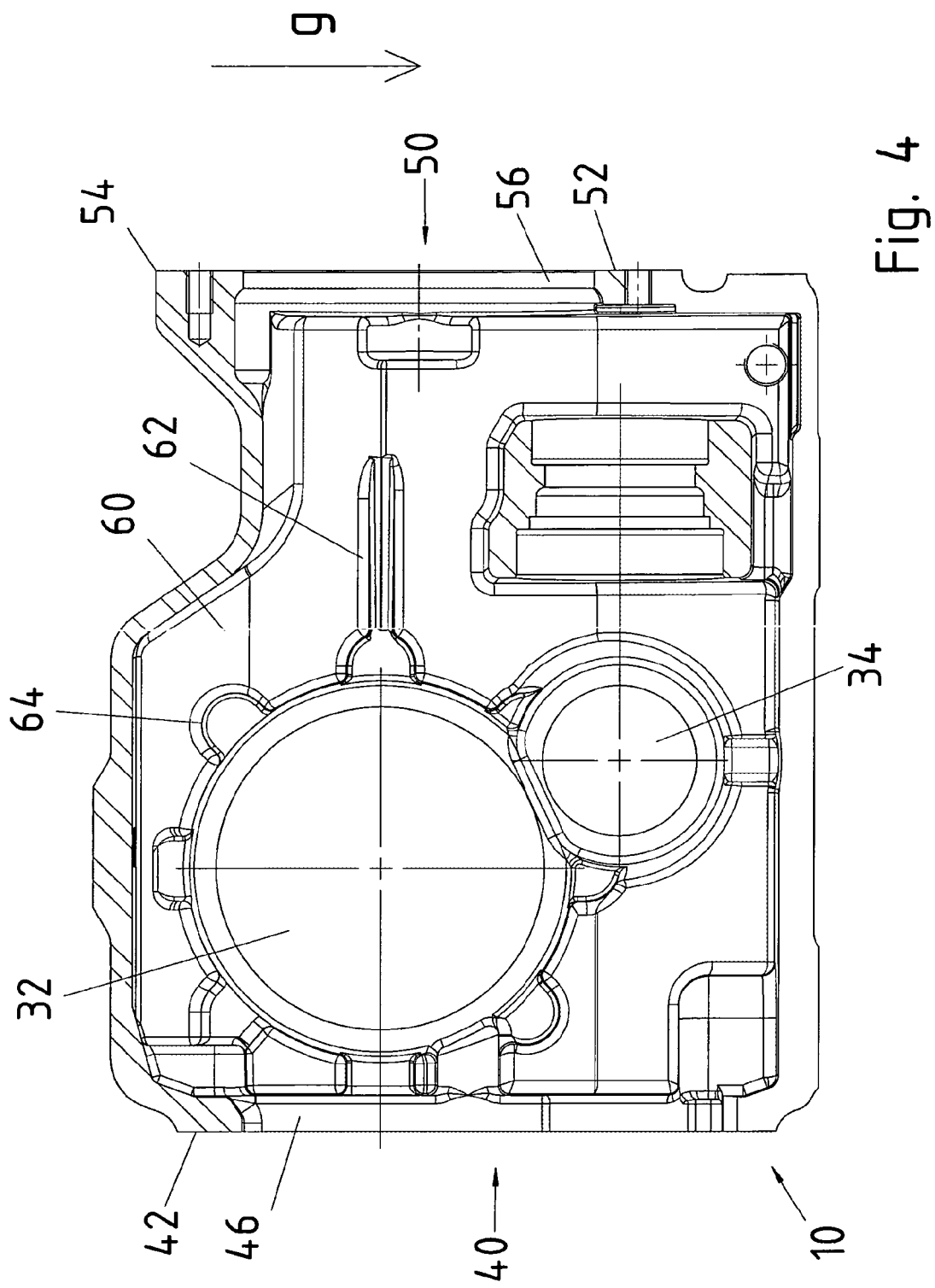
FIG. 4 is an intersection through the gear housing shown in FIG. 1.

Since each section of the surface is convexly formed in at least one direction, it is possible to dispense with the formation of drain channels. This simplifies the casting mold and the entire manufacturing process of gear housing 10. Undesired projections are also avoided. The structurally necessary reinforcements are shifted to an inner surface 60 of gear housing 10. By way of example, FIG. 4 shows an elongated thickening 62 and a semicircular thickening 64 as reinforcement on inner surface 60 of gear housing 10. This also simplifies further treatment of the surface of gear housing 10.

The attachment faces are uncurved, and in the installed state of gear housing 10, are covered by corresponding cover elements and/or attached devices. The sealing elements needed between the cover element or attached device and gear housing 10 are disposed such that no gaps or hidden cavities are formed. Only outer edges of the attachment faces are edges in the true sense, that is, edges which are formed within the bounds of production possibilities, by two adjoining surfaces directly butting against each other. The adjoining surfaces of the edges are usually formed by a section of the surface and an attachment face. In the exemplary embodiment shown in FIG. 1, transitions between two sections are implemented as sections.

First attachment face 14 forms one common end face for first cutout 32 and second cutout 34 of the first output side. Second output side 31 is implemented correspondingly.

A radius of curvature of approximately 6 mm is advantageous for the concave and convex curves, and a radius of curvature of approximately 3 mm is barely suited to allow fluids on the surface to flow off well and to permit easy removal of contaminants. Therefore, the surface, except for the outer edges of the attachment faces, has only radii of curvature along any direction which are greater than 3 mm; especially advantageously, the radii of curvature are greater than 6 mm. In particular, an edge-like region 13 is rounded off in such a way that it has the preferred radii of curvature.

The radius of curvature is defined by the radius of a circle which conforms to the surface. Curvature is understood to be the reciprocal value of the radius of curvature.

Likewise, a plane, which is flat within the bounds of manufacturing precision, should form an angle of greater than 3 degrees with respect to an imaginary plane, whose unit vector is collinear with the force of gravity.

In the example embodiment shown in FIG. 1, gear housing 10 has a first through-bore 70 and a second through-bore 72. In the assembled state of the gear, they are closed by a screw plug or a vent valve. Depending on the mounting position of the gear, the vent valve may be screwed into first through-bore 70 or second through-bore 72. First and second through-bores 70, 72 are surrounded by a corresponding attachment face, like, for example, an attachment face for venting 71.

Figure 2:
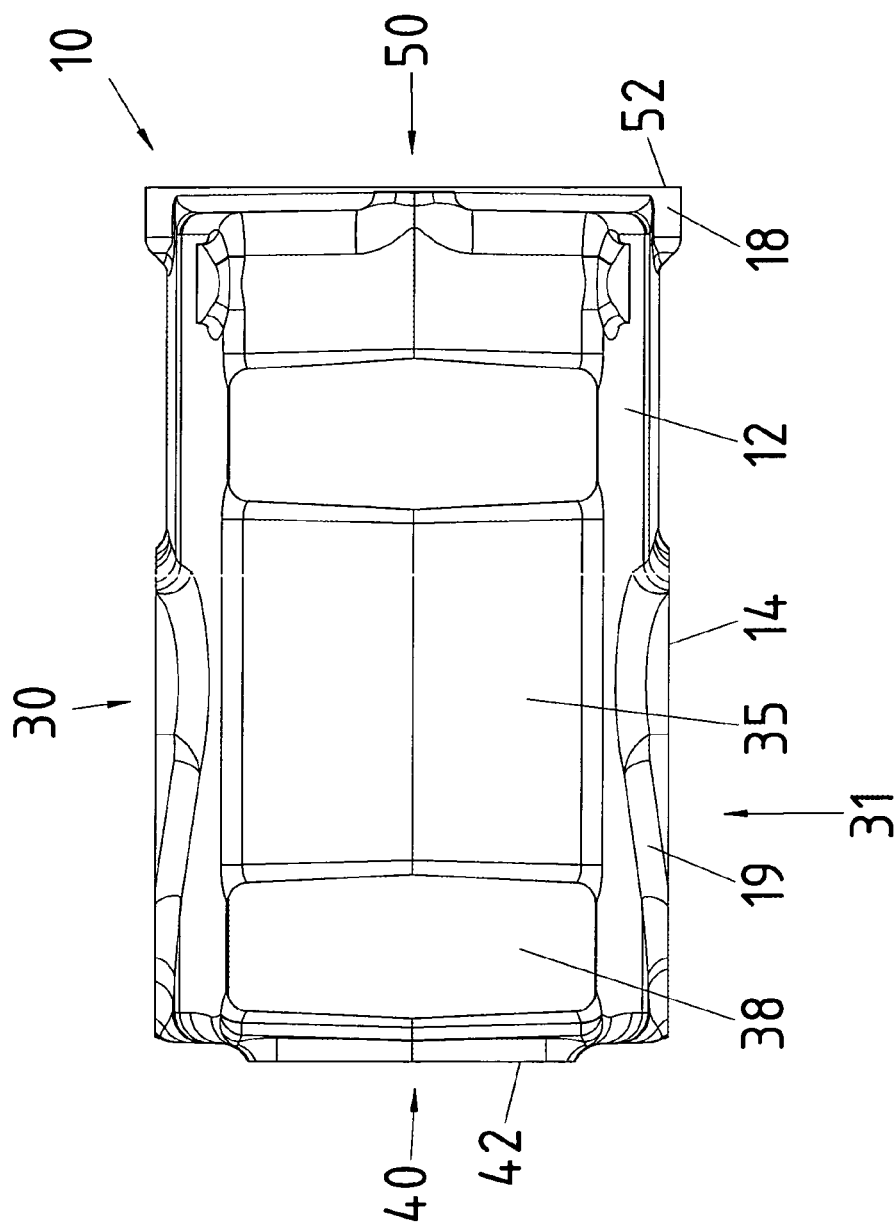
FIG. 2 is a bottom view of the gear housing shown in FIG. 1.

As a bottom view, FIG. 2 shows a base side of gear housing 10 shown in FIG. 1. The base side has an attachment face as base face 38 and a third plane 35. Given a suitable mounting position, base face 38 is used as a bearing face for gear housing 10. In the case of a specific embodiment of gear housing 10 for a slip-on gear mechanism (not shown), this bearing face is not provided, and third plane 35 extends almost over the entire length of the base side.

Figure 3:
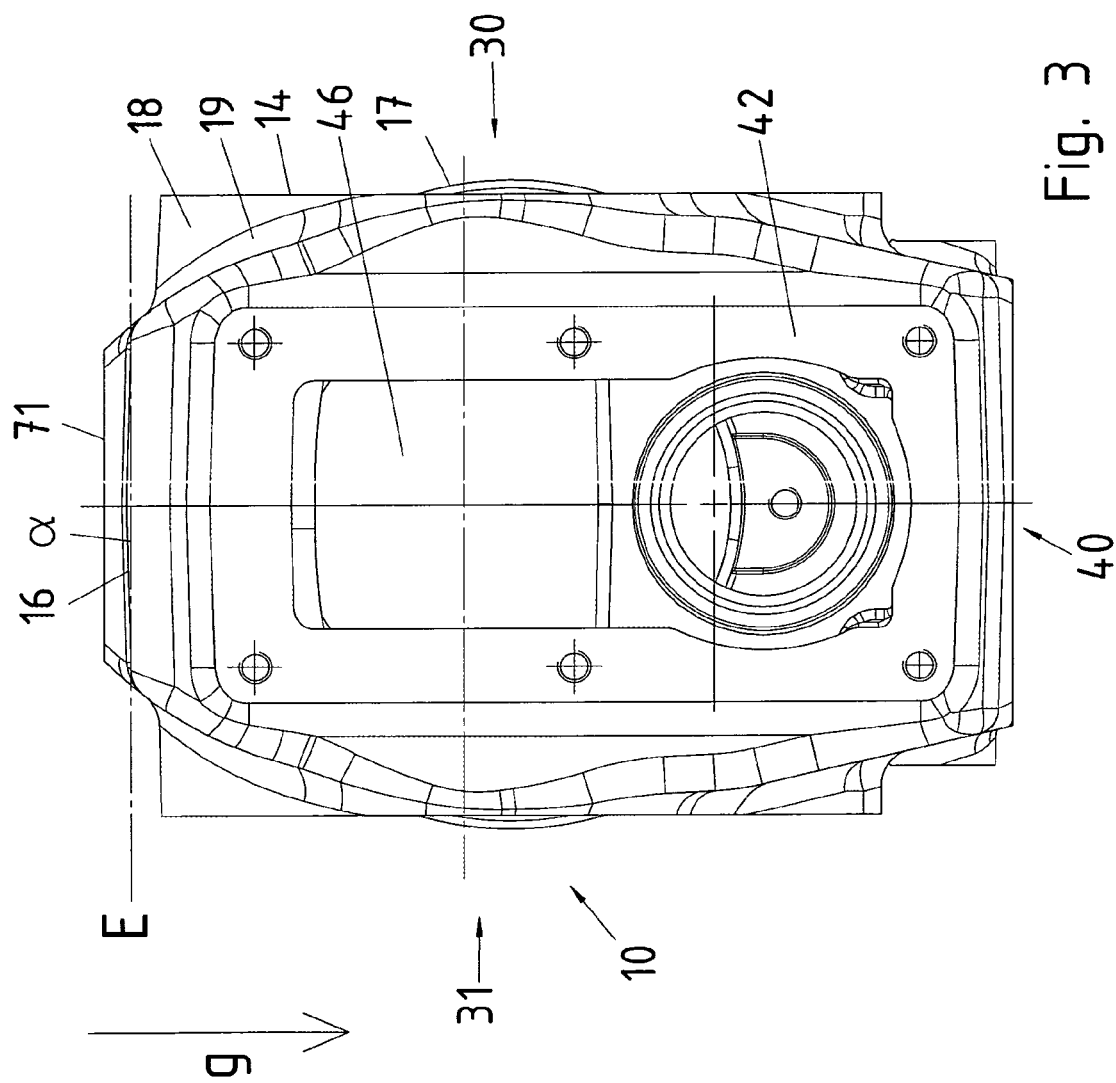
FIG. 3 is a rear view of the gear housing shown in FIG. 1.

A mounting side 40 of gear housing 10 is shown in FIG. 3 in the rear view of gear housing 10.

Figure 5:
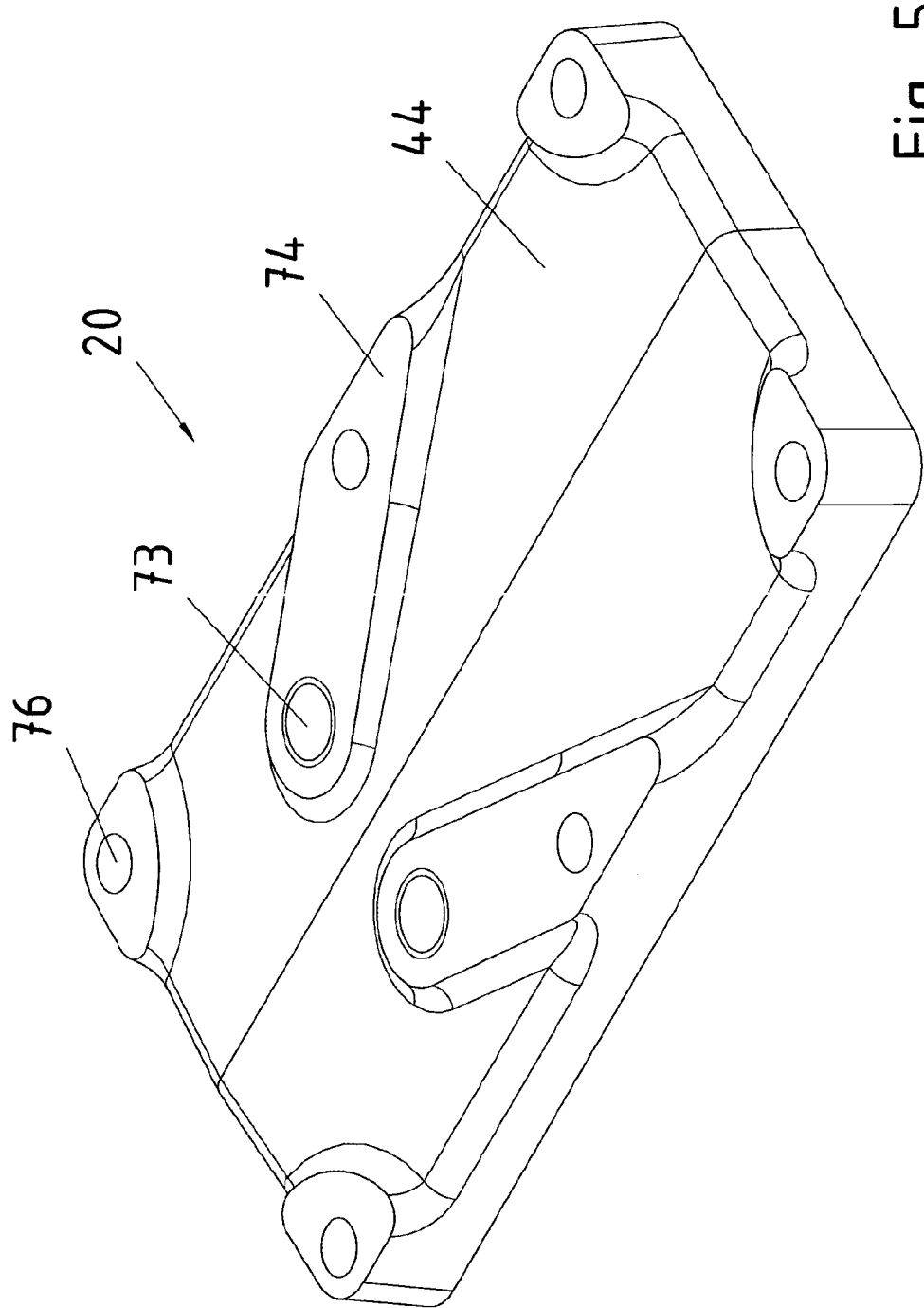
FIG. 5 is a perspective top view of a cover for the gear housing shown in FIG. 1.

Assembly opening 46 is used to install or insert the shafts and gear wheels disposed in gear housing 10. Assembly opening 46 is framed by a second attachment face 42, which has bores having internal threads. After the gear has been installed in gear housing 10, a cover 20, shown in FIG. 5, is screwed onto second attachment face 42.

Cover 20 is substantially rectangular and seals assembly opening 46. The surface of the cover itself has sections, planes and attachment face configured in a manner corresponding to gear housing 10. Mounting holes 76 are implemented in the cover. Screws, by which cover 20 is secured on gear housing 10, are guided through these mounting holes 76. The screws are implemented in such a way that they cover the counter faces—shown in FIG. 5—for the screws. Thus, these counter faces also form attachment faces.

An area of the surface of cover 20 forms a gable-roof-type surface 44, whose gable divides the surface along the long side of the rectangle into two halves. The gable-roof-type surfaces form an angle of at least three degrees with respect to an imaginary plane of reference of cover 20.

Attachment faces of cover 20 are used as support for suitable fastening screws for screwing cover 20 onto second attachment face 42. The attachment faces are able to be covered by matchingly formed cover elements such as screwheads or underlay elements, so that the surface ultimately visible in the mounted state has sections which are only convex or at least convex in one direction.

One special attachment face 74 of cover 20 extends into the gable-roof-type surface and has a cover bore 73 in which a vent valve or a screw plug is able to be screwed into place.

FIG. 4 shows gear housing 10, shown in FIG. 1, in section. Reinforcements of gear housing 10, which are usually formed on the housing surface in the case of the related art, are shifted into the interior of gear housing 10 in the case of gear housing 10. For example, semicircular thickenings 64 or elongated thickenings 62 are formed as reinforcements on the inner side of gear housing 10. Nevertheless, the customary gear-tooth pieces and shafts, e.g., for a bevel gear having two spur-gear stages and one bevel-gear stage, are able to be incorporated into the gear housing.

An intermediate plate, shown in FIG. 6, has a basically egg-shaped surface area which is substantially congruent with first attachment face 14. A bore pattern implemented in the intermediate plate corresponds to first bore pattern 33 around first cutout 32 in first attachment face 14. Intermediate plate 24 has a cutout 75 corresponding to first cutout 32. When intermediate plate 24 is attached to first attachment face 14, the intermediate plate covers second cutout 34. Thus, the second cutout is reliably sealed without a depression accessible from outside or a cavity accessible from outside developing in the total surface area of the mounted gear. At the same time, intermediate plate 24 is realizable such that a convex surface is present over second cutout 34.

Second output side 31 may be covered in analogous fashion or by a further cover element which covers both cutouts in the second output side without a remaining opening.

FIG. 7 shows a torque-counteracting support 26, whose surface is shaped to correspond to the surface of gear housing 10. Torque-counteracting support 26 has one larger and one smaller, approximately annular element 90, 92, which are interconnected by two legs 94, 96. The two legs 94, 96, lying in one plane, are integrally molded on the peripheries of approximately annular elements 90, 92 and are at an angle to each other, so that the angle opens toward larger, approximately annular element 90. Larger, approximately annular element 90 has flattened end faces, in which a further bore pattern 98 is introduced that corresponds to first bore pattern 33. Thus, torque-counteracting support 26, with interposition of intermediate plate 24, may be screwed on gear housing 10 in various positions predefined by further bore pattern 98. Smaller, approximately annular element 92 is used to attach torque-counteracting support 26 to a rotatably-fixed device.

Flanges, formed in conformance with the surface of gear housing 10, may also be attached to the attachment faces, especially first attachment face 14 and intermediate plate 24 and torque-counteracting support 26, respectively, and third attachment face 52. The flanges are used as adapters for the connection to corresponding driving mechanisms, such as electric motors, or devices to be driven, or couplings, brakes, etc.

Advantageously, gear housing 10, intermediate plate 24 and torque-counteracting support 26 are produced from stainless steel, especially from the stainless steel GX5CrNi19-10. Due to the great strength and the reinforcements on the inner side of the gear housing, given suitable operating conditions, it is then possible to dispense with a vent. Through-bores 70, 72 and corresponding attachment faces 71 may then be omitted. No expense is incurred for the matching cover element, either. Likewise, the geometry of the surface is realizable with fewer concave curves. For example, second plane 16 is then continued in the direction of input side 50, and together with first plane 15, forms one continuous plane.

Known gear housings, not shown here, have what are termed removal pockets on certain attachment faces, especially in input side 50. In order to remove attached devices, a suitable tool is introduced into the removal pocket to pry off the attached device. The removal pockets are usually formed, for example, in third attachment face 52 of input side 52 as, in particular, wedge-shaped recesses accessible from the surface. The removal pockets interrupt an edge 54 of the third attachment face of input side 50, that is, deform this edge 54. In the case of known gears, cavities accessible from outside are formed by the removal pockets. In example embodiments, these cavities are omitted and an outer edge 54 of third attachment face 52 forms one uninterrupted circle. Third attachment face 52 is formed as end face of the input side for the flange-mounting of a motor.

In example embodiments, the surface is made up only of sections and attachment faces. The sections and attachment faces are implemented as described above.

Gear housing 10 is advantageously manufactured as a cast part. The surface of gear housing 10 is subsequently ground and/or electropolished, so that the surface has an arithmetical average roughness Ra between approximately 0.8 μm and approximately 6.0 μm, preferably between approximately 2.5 μm and approximately 3.5 μm. Compared to smooth surfaces, this has the advantage that dirt particles or other contaminants such as bacteria are not completely in contact with the surface. An adhesion force between bacteria or dirt and the surface is thereby reduced, and contaminants are more easily removable.

In an alternative method, the surface may additionally be coated with an anti-corrosion coating and/or anti-adhesive coating. In so doing, preferably a polymer such as polytetrafluoroethylene is used.

The gear housing for a bevel gear is not restricted to bevel gears, and may also be applied to gear housings for other gears.

What is claimed is:

1. A gear housing for a bevel gear, comprising:
a surface including sections and at least a first attachment face and a second attachment face, each section bordering on the at least first and second attachment faces and continuously convexly curved along at least one surface curve; and
a third attachment face including an outer edge forming a continuous, uninterrupted circular opening such that a motor is attachable via flange-mounting;
wherein the first attachment face is on a first output side of the gear housing, the second attachment face is on a second output side of the gear housing, and the third attachment face is on an input side of the gear housing, the first and second output sides being parallel to each other and positioned vertically with respect to a plane of the input side;
wherein an inner face of the gear housing includes reinforcement as a semicircular thickening and an elongated thickening section,
wherein each section is made of only at least one region,
wherein every region of every section is continuously convex in at least one direction, and
wherein every attachment face is continuously curved.

2. A gear housing for a bevel gear, comprising:
a surface including sections, planes and at least a first attachment face and a second attachment face, each section bordering on the at least first and second attachment faces or planes and, each section continuously convexly curved along at least one surface curve, belonging to one point of the section, with the section, the planes being disposed such that in mounting position provided for the gear housing, each plane forms an angle with respect to an imaginary plane whose normal vector is collinear with a direction of gravity, the angle being greater than or equal to three degrees; and
a third attachment face including an outer edge forming a continuous, uninterrupted circular opening such that a motor is attachable via flange-mounting;
wherein the first attachment face is on a first output side of the gear housing, the second attachment face is on a second output side of the gear housing, and the third attachment face is on an input side of the gear housing, the first and second output sides being parallel to each other and positioned vertically with respect to a plane of the input side;
wherein an inner face of the gear housing includes reinforcement as a semicircular thickening and an elongated thickening section,
wherein each section is made of only at least one region,
wherein every region of every section is continuously convex in at least one direction, and
wherein every attachment face is continuously curved.

3. The gear housing according to claim 2, wherein the sections have a radius of curvature of at least one of (a) greater than approximately 3 mm and (b) greater than approximately 6 mm.

4. The gear housing according to claim 2, wherein the first, second, and third attachment faces, which include a bore, are perpendicular or parallel to each other, and in an installed state of the gear housing, the first, second, and third attachment faces are adapted to be covered by at least one of (a) corresponding faces of attached devices and (b) by a matching cover element.

5. The gear housing according to claim 2, wherein the sections, and the surface, include an intermediate surface which is convexly curved along a first surface curve and is concavely or convexly curved along a second surface curve through a same point.

6. The gear housing according to claim 2, wherein the first output side of the gear housing includes a first and second through-cutout, the first and second cutouts forming a common end face, which represents the first attachment face.

7. The gear housing according to claim 6, wherein the first cutout has a diameter different from the second cutout.

8. The gear housing according to claim 6, wherein the first cutout has a diameter larger than the second cutout.

9. The gear housing according to claim 6, wherein the first cutout is adapted to mount an output shaft.

10. The gear housing according to claim 6, wherein the second cutout is adapted to mount an intermediate shaft.

11. The gear housing according to claim 6, wherein the first and second cutouts are through-holes from the first attachment face to the second attachment face.

12. The gear housing according to claim 2, wherein the gear housing is produced from at least one of (a) stainless steel and (b) stainless steel GX5CrNi19-10.

13. The gear housing according to claim 2, wherein the surface is coated with at least one of (a) a non-corrosive coating, (b) anti-adhesive coating, and (c) a polymer.

14. The gear housing according to claim 2, wherein the surface has an arithmetical average roughness at least one of (a) between approximately 0.8 µm and approximately 6.0 µm and (b) between approximately 2.5 µm and approximately 3.5 µm.

15. An assembly, comprising:
a gear housing as recited in claim 2 and mounted in a mounting position such that the planes form an angle with respect to an imaginary plane having a normal vector collinear with a direction of gravity, the angle being greater than or equal to three degrees.

16. A method for producing a gear housing according to claim 2, comprising:
casting the gear housing from stainless steel; and
subsequently at least one of (a) grinding and (b) electropolishing the surface of the gear housing.

* * * * *